Aug. 16, 1932.  P. HAWKINS  1,872,637
CABINET FOR A DRINK MIXER
Filed Sept. 8, 1930
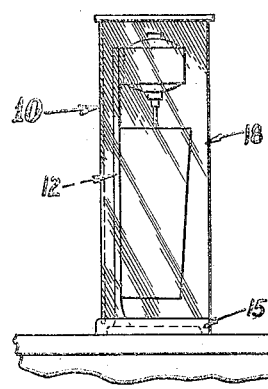
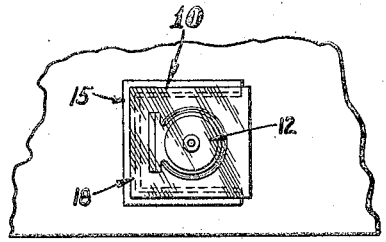
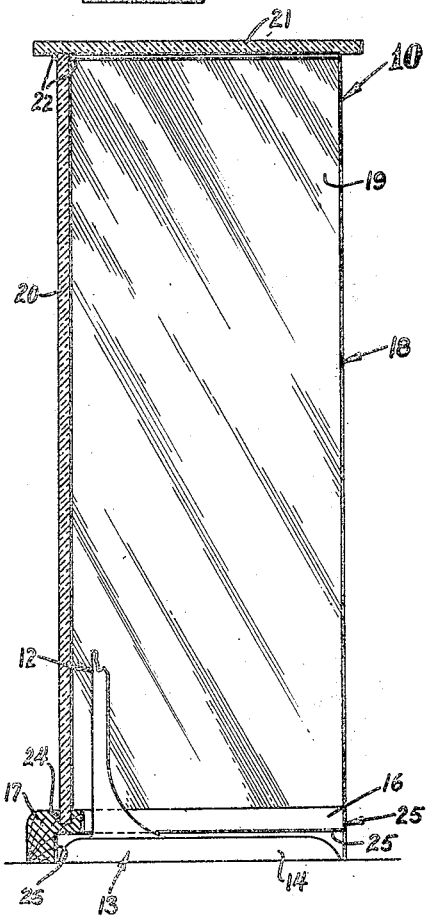
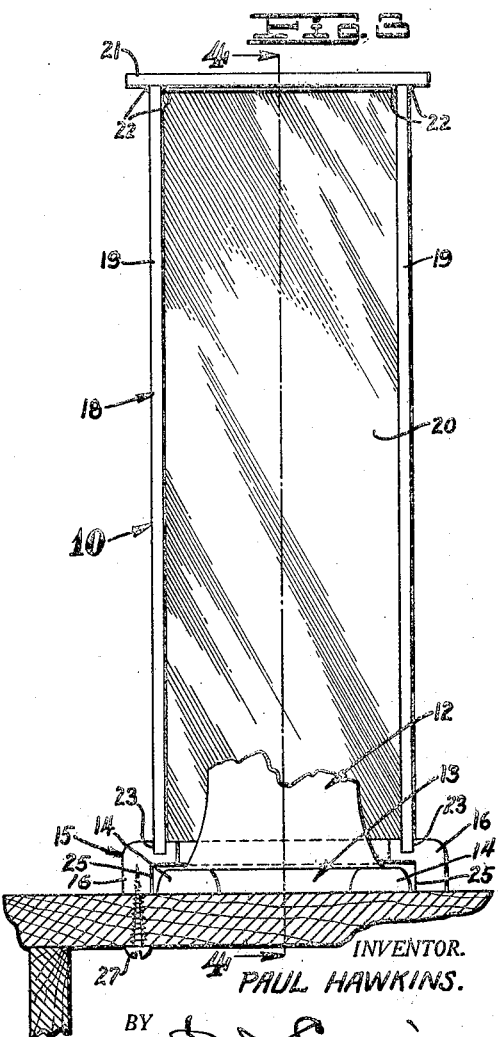
INVENTOR.
PAUL HAWKINS.
BY
ATTORNEY.

Patented Aug. 16, 1932

1,872,637

UNITED STATES PATENT OFFICE

PAUL HAWKINS, OF LOS ANGELES, CALIFORNIA

CABINET FOR A DRINK MIXER

Application filed September 8, 1930. Serial No. 480,331.

This invention relates to improvements in cabinet for drink mixers.

Another object of the invention is to provide a device of the class described which while allowing the operator to look in the mixing container prevents him from breathing into the container.

Other objects and the advantages of this invention will be apparent from the following description taken in connection with the accompanying drawing wherein:

Fig. 1 is a side elevation showing my invention.

Fig. 2 is a top plan view of the invention.

Fig. 3 is a central sectional view showing the cover with the mixer top broken away and Fig. 4 is a front elevation showing my invention.

Referring to the drawing by reference characters I have indicated my improved device generally at 10. As shown, this device includes an electrically operated mixer 12 which may be used for mixing drinks at soda fountains and which includes a base 13 having spaced feet 14 and includes a support 15 which as shown is made of wood and includes opposed side rails 16 and a back rail 17.

Mounted on the support 15 I provide a transparent cabinet or cover 18 which comprises opposed sides 19 which preferably are made of glass, a back member 20 and a top member 21 which are also made of glass. The side members 19, the back member 20 and the top member 21 are all joined together by a glass cement as indicated at 22 or in any other suitable manner so that the cover 18 can be moved as a unit.

The side rails 16 of the support 15 are each provided in their upper face with a groove 23 in which the lower ends of the side members 19 are positioned and the back rail 17 is provided in its upper face with a groove 24 in which the lower end of the back member 20 is positioned.

The lower edges of the side members 19 and the back member 20 fit their respective grooves snugly but are designed to be readily removable therefrom to facilitate cleaning of the device 10 or the mixer 12.

To make the device compact the side rails 16 are provided on their inner faces with a rabbeted or cut-away portion 25 which is adapted to fit over a portion of the mixer legs 14 and the back rail 17 is provided with a similar rabbeted portion 26 which is adapted to fit over a portion of the back of the mixer base 13.

The support 15 is preferably secured to the counter, upon which it is to be used, in any desired manner such as by screws 27. The support 15 serves to hold the cabinet 18 assembled and due to the rabbeted portion 26 the support 15 tends to prevent tilting of a drink mixer disposed within the cabinet.

The device is preferably positioned on the counter with the side rails 16 parallel with the rear edge of the counter so that the open front of the device is presented to the side. When an operator places the container on the mixer 12 he does so through the open front of the device and when he looks into the container to determine the state of the substance being mixed he does so through the top member 21 or one of the side members 19 as it would be awkward to try to look in the container through the open front which is disposed laterally to him. As the operator is observing the contents of the container the top member 21 and the side member 19 prevents his breath from blowing into the container.

From the foregoing description it will be apparent that I have provided a novel sanitary cabinet for a drink mixer which is simple in construction and highly efficient in use.

Having thus described my invention, I claim:

In a drink mixer cabinet the combination of a support and a transparent enclosure, said support including a pair of spaced side rails and a back rail said side rails each having an inwardly directed flange thereon to provide a recessed portion on each side adapted to receive the base of a drink mixer and prevent overturning of the same, the front of said support being open to receive the base of a drink mixer, said transparent enclosure including a pair of spaced transparent side members, a back member engaging said side members and a transparent top member engaging and secured to said side members and to said back member, the bottom of said side and back members engaging and being secured to said rails, the front of said transparent enclosures being open to receive the drink mixer.

In testimony whereof, I hereunto affix my signature.

PAUL HAWKINS.